(12) United States Patent
Fan et al.

(10) Patent No.: US 12,265,500 B2
(45) Date of Patent: Apr. 1, 2025

(54) METHOD, ELECTRONIC DEVICE, AND COMPUTER PROGRAM PRODUCT FOR IDENTIFYING MEMORY SNAPSHOT

(71) Applicant: DELL PRODUCTS L.P., Round Rock, TX (US)

(72) Inventors: Huijuan Fan, Chengdu (CN); Biao Yan, Chengdu (CN)

(73) Assignee: DELL PRODUCTS L.P., Round Rock, TX (US)

( * ) Notice: Subject to any disclaimer, the term of this patent is extended or adjusted under 35 U.S.C. 154(b) by 325 days.

(21) Appl. No.: 17/678,694

(22) Filed: Feb. 23, 2022

(65) Prior Publication Data

US 2023/0222096 A1 Jul. 13, 2023

(30) Foreign Application Priority Data

Jan. 12, 2022 (CN) .......................... 202210030424.7

(51) Int. Cl.
   *G06F 16/11* (2019.01)
(52) U.S. Cl.
   CPC ................... *G06F 16/128* (2019.01)
(58) Field of Classification Search
   CPC ...................................................... G06F 16/128
   See application file for complete search history.

(56) References Cited

U.S. PATENT DOCUMENTS

| | | | | |
|---|---|---|---|---|
| 7,885,988 B2 * | 2/2011 | Bashyam | ................ | H03M 7/30 |
| | | | | 707/972 |
| 8,943,282 B1 * | 1/2015 | Armangau | ............ | G06F 16/128 |
| | | | | 711/126 |
| 8,972,351 B1 * | 3/2015 | Kumar | .................. | G06F 16/128 |
| | | | | 707/639 |
| 9,846,698 B1 * | 12/2017 | Panidis | ................ | G06F 16/128 |
| 10,019,180 B1 * | 7/2018 | Miah | ........................ | G06F 3/065 |
| 10,140,188 B2 * | 11/2018 | Wallace | .............. | G06F 11/1461 |
| 10,423,342 B1 * | 9/2019 | Chheda | ................. | G06F 3/0685 |
| 10,761,941 B1 * | 9/2020 | Redko | ................. | G06F 11/1451 |
| 11,037,096 B2 * | 6/2021 | O'Hara | ..................... | G06N 20/20 |
| 11,169,889 B1 * | 11/2021 | Warfield | ............... | G06F 3/0653 |
| 11,232,069 B2 * | 1/2022 | Gotkhindikar | .......... | G06F 16/13 |
| 11,263,172 B1 * | 3/2022 | Chang | .................... | G06F 16/128 |
| 11,360,689 B1 * | 6/2022 | Grunwald | ........... | G06F 11/1451 |
| 11,397,645 B1 * | 7/2022 | Quan | .................. | G06F 12/0253 |
| 11,593,132 B1 * | 2/2023 | Rane | ................... | G06F 9/45558 |

(Continued)

*Primary Examiner* — Robert W Beausoliel, Jr.
*Assistant Examiner* — Susan F Rayyan
(74) *Attorney, Agent, or Firm* — WOMBLE BOND DICKINSON (US) LLP

(57) ABSTRACT

Embodiments of the present disclosure relate to a method, an electronic device, and a computer program product for identifying a memory snapshot. The method includes determining, based on operation-related historical information for a plurality of memory snapshots, a probability that the plurality of memory snapshots are operated within a first time period. The method further includes, if the determined probability is less than a threshold associated with a duration of the first time period, identifying the plurality of memory snapshots for deletion. By use of the method, memory snapshots with a low probability of being operated in a future period of time can be identified, so that such memory snapshots are deleted to reduce usage of storage resources.

20 Claims, 5 Drawing Sheets

(56) References Cited

U.S. PATENT DOCUMENTS

| | | | | |
|---|---|---|---|---|
| 11,748,299 B2* | 9/2023 | Yarlagadda | G06F 16/1752 | 707/694 |
| 11,789,971 B1* | 10/2023 | Kuppahally | G06F 16/27 | 707/634 |
| 11,860,891 B2* | 1/2024 | Nochlin | G06F 16/24534 | |
| 11,921,670 B1* | 3/2024 | Emberson | G06F 16/125 | |
| 12,026,137 B1* | 7/2024 | Sethi | G06F 16/215 | |
| 2003/0167380 A1* | 9/2003 | Green | G06F 12/023 | 714/E11.119 |
| 2007/0156985 A1* | 7/2007 | Tsai | G06F 11/1435 | 711/162 |
| 2013/0282662 A1* | 10/2013 | Kumarasamy | G06F 3/0689 | 707/649 |
| 2014/0149698 A1* | 5/2014 | Ezra | G06F 12/0864 | 711/162 |
| 2015/0347548 A1* | 12/2015 | Mortensen | G06F 16/2365 | 707/618 |
| 2016/0147609 A1* | 5/2016 | Wallace | G06F 16/128 | 707/647 |
| 2017/0357465 A1* | 12/2017 | Dzeryn | G06F 3/0647 | |
| 2019/0243719 A1* | 8/2019 | Yadav | G06F 11/1448 | |
| 2019/0332574 A1* | 10/2019 | Puri | G06F 3/0671 | |
| 2020/0065399 A1* | 2/2020 | Desai | G06F 9/45558 | |
| 2020/0125531 A1* | 4/2020 | Troshin | G06F 16/2474 | |
| 2020/0301816 A1* | 9/2020 | Kulkarni | G06F 11/3664 | |
| 2020/0348863 A1* | 11/2020 | Venkatesan | G06F 3/0659 | |
| 2021/0034240 A1* | 2/2021 | Wang | G06F 3/0649 | |
| 2021/0133211 A1* | 5/2021 | Davis | G06F 16/24553 | |
| 2021/0286535 A1* | 9/2021 | Aldred | G06F 11/3442 | |
| 2021/0286760 A1* | 9/2021 | Aldred | G06F 16/162 | |
| 2022/0229734 A1* | 7/2022 | Seela | G06F 11/1451 | |
| 2022/0229805 A1* | 7/2022 | Chakeres | G06F 16/27 | |
| 2022/0342847 A1* | 10/2022 | Singh | G06F 16/128 | |
| 2022/0374446 A1* | 11/2022 | Savir | G06F 16/9024 | |
| 2023/0128602 A1* | 4/2023 | Park | G06F 16/122 | 714/6.3 |
| 2023/0147026 A1* | 5/2023 | Munshani | G06F 11/1435 | 714/15 |
| 2023/0214146 A1* | 7/2023 | Singh | G06F 3/064 | 711/154 |
| 2023/0222094 A1* | 7/2023 | Zhang | G06F 16/128 | 707/649 |

* cited by examiner

METHOD, ELECTRONIC DEVICE, AND COMPUTER PROGRAM PRODUCT FOR IDENTIFYING MEMORY SNAPSHOT

CROSS-REFERENCE TO RELATED APPLICATION

This patent application claims priority, under 35 U.S.C. § 119, of Chinese Patent Application No. 202210030424.7, filed Jan. 12, 2022, which is incorporated by reference in its entirety.

TECHNICAL FIELD

Embodiments of the present disclosure relate to the technical field of computers, and in particular, to a method, an electronic device, an apparatus, a medium, and a computer program product for identifying a memory snapshot.

BACKGROUND

Memory snapshots saved at different times help to speed up data processing and ensure data security so that a system can be rolled back to a desired version. However, an increasing number of memory snapshots occupy a large number of memory resources. If a probability that operations on memory snapshots (for example, search, access, backup, etc.) will occur in the future can be referred to, some memory snapshots that are unlikely to be operated again can be deleted, which will improve the overall performance of a computing device and save limited storage resources. Therefore, there is a need for a method for identifying a memory snapshot, wherein the identified memory snapshot has a low probability of being operated in a future period of time.

SUMMARY OF THE INVENTION

Embodiments of the present disclosure relate to a method, an electronic device, an apparatus, a medium, and a computer program product for identifying a memory snapshot.

In a first aspect of the present disclosure, a method for identifying a memory snapshot is provided. The method includes determining, based on operation-related historical information for a plurality of memory snapshots, a probability that the plurality of memory snapshots are operated within a first time period. The method further includes, if the determined probability is less than a threshold associated with a duration of the first time period, identifying the plurality of memory snapshots for deletion.

In a second aspect of the present disclosure, an electronic device is provided. The electronic device includes a processor and a memory coupled to the processor, the memory having instructions stored therein which, when executed by the processor, cause the device to perform actions. The actions include determining, based on operation-related historical information for a plurality of memory snapshots, a probability that the plurality of memory snapshots are operated within a first time period. The actions further include, if the determined probability is less than a threshold associated with a duration of the first time period, identifying the plurality of memory snapshots for deletion.

In a third aspect of the present disclosure, an apparatus for identifying a memory snapshot is provided. The apparatus includes a probability determining module configured to determine, based on operation-related historical information for a plurality of memory snapshots, a probability that the plurality of memory snapshots are operated within a first time period. The apparatus further includes a snapshot identification module configured to, if the determined probability is less than a threshold associated with a duration of the first time period, identify the plurality of memory snapshots for deletion.

In a fourth aspect of the present disclosure, a computer-readable storage medium is provided. The computer-readable storage medium stores one or more computer instructions, wherein the one or more computer instructions are executed by a processor to implement the method according to the first aspect.

In a fifth aspect of the present disclosure, a computer program product is provided. The computer program product includes one or more computer instructions, wherein the one or more computer instructions are executed by a processor to implement the method according to the first aspect.

The Summary of the Invention part is provided to introduce the selection of concepts in a simplified form, which will be further described in the Detailed Description below. The Summary of the Invention part is neither intended to identify key features or principal features of the claimed subject matter, nor intended to limit the scope of the claimed subject matter.

BRIEF DESCRIPTION OF THE DRAWINGS

The above and other features, advantages, and aspects of the embodiments of the present disclosure will become more apparent when taken in conjunction with the accompanying drawings and with reference to the following specific implementation modes. In the accompanying drawings, identical or similar reference numerals represent identical or similar elements, in which.

In all the accompanying drawings, identical or similar reference numerals indicate identical or similar elements.

DETAILED DESCRIPTION

Figure 1:
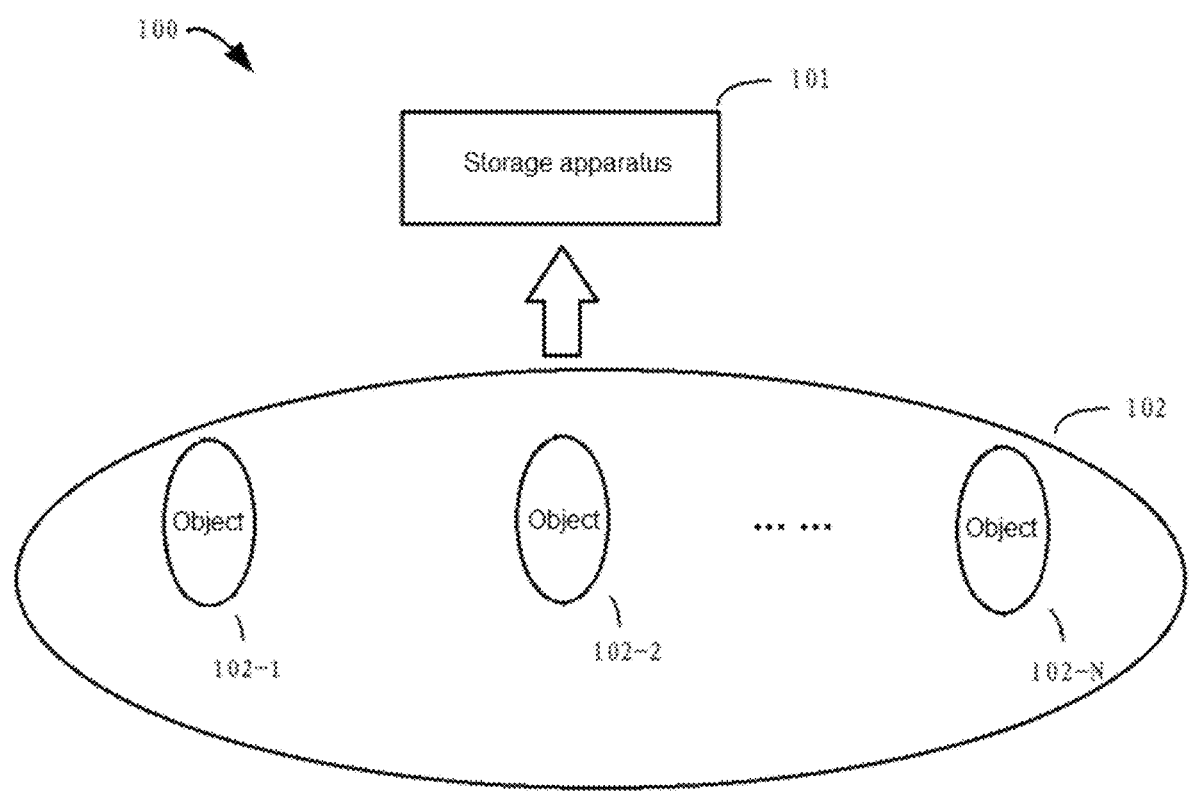
FIG. 1 illustrates a schematic diagram of an example environment in which embodiments of the present disclosure can be implemented.

Embodiments of the present disclosure will be described in more detail below with reference to the accompanying drawings. Although the drawings show certain embodiments of the present disclosure, it should be understood that the present disclosure can be implemented in various forms and should not be construed as being limited to the embodiments set forth herein. Instead, these embodiments are provided for a more thorough and complete understanding of the present disclosure. It should be understood that the accompanying drawings and embodiments of the present disclosure are for illustrative purposes only, and are not intended to limit the protection scope of the present disclosure.

The term "include" and its variants as used herein mean open-ended inclusion, i.e., "including but not limited to." The term "based on" is "based at least in part on." The term "one embodiment" means "at least one embodiment." The term "another embodiment" means "at least one further embodiment." The terms "first," "second," and the like may refer to different or the same objects. Other explicit and implicit definitions may also be included below.

The inventor has noticed that, with the widespread use of memory snapshots, the speed of accessing data in a memory is increased to a certain extent, and the security of the data is also improved. Furthermore, a system can be rolled back to a desired version when needed. However, as the number of memory snapshots increases, more and more storage resources are consumed, which increases the instability of an entire computing device. For some memory snapshots, they may need to be operated (e.g., backed up) frequently, but for some other memory snapshots, they will rarely be operated again. Therefore, deleting these unimportant memory snapshots that will rarely be operated again will improve the overall performance of the computing device and save limited storage resources.

In view of this, a method of the present disclosure provides a method for identifying a memory snapshot, wherein the identified memory snapshot has a low probability of being operated in a future period of time. As will be appreciated from the description below, compared with a known conventional solution, the probability of operating a memory snapshot within a future period of time is determined (e.g., predicted) by means of operation-related historical data for the memory snapshot. According to a relation between the probability and a threshold, it can be chosen whether to delete or continue to maintain the memory snapshot. In this way, the deletion of a memory snapshot can be well-founded, thereby improving the correctness of a decision on whether to delete the memory snapshot. Therefore, the working principle and mechanism of the present disclosure are significantly different from any known method.

In the following description, certain embodiments will be discussed with reference to memory management of an object as a single entity. However, it should be understood that this is only for a better understanding of the principle and idea of the embodiments of the present disclosure, and is not intended to limit the scope of the present disclosure in any way.

FIG. 1 is a schematic diagram of example environment 100 in which embodiments of the present disclosure can be implemented.

Storage apparatus 101 (which may also be a storage apparatus cluster) may receive a plurality of objects (which form single entities of memory snapshots) for storage, such as object 102-1 and object 102-2 of FIG. 1. There may be a plurality of objects, e.g., first object 102-1, second object 102-2, . . . , Nth object 102-N (referred to individually or collectively as object 102).

According to a corresponding memory management policy, such memory snapshots (or objects) may be operated (e.g., backed up, re-stored, deleted individually, or deleted in batches) on a regular or irregular basis, automatically or manually. If the probability that these objects are used within a period of time is low and these objects are not necessary, it can be considered to delete them. Therefore, there is a need to provide such memory snapshots (e.g., objects) that can potentially be deleted. For convenience, the following description does not deliberately distinguish objects from memory snapshots.

It can be understood that example environment 100 shown in FIG. 1 is merely illustrative, and is not intended to limit the scope of the present disclosure. Example environment 100 may further include various additional devices, apparatuses, and/or modules. Furthermore, the modules shown in FIG. 1 are also illustrative only and are not intended to limit the scope of the present disclosure. In some embodiments, some modules may be integrated into one physical entity or be further divided into more modules.

Figure 2:
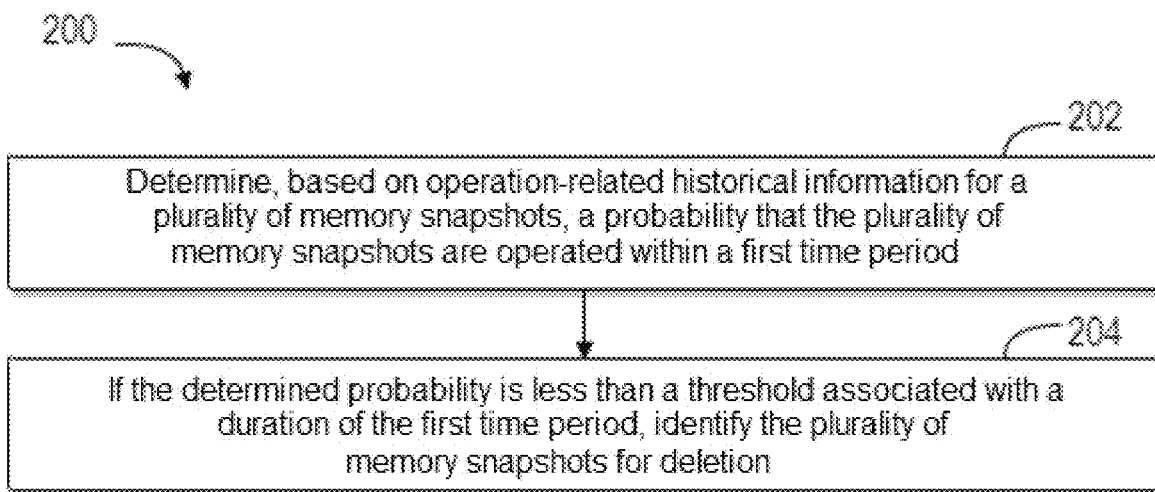
FIG. 2 illustrates a flow chart of a method for identifying a memory snapshot according to some embodiments of the present disclosure.

FIG. 2 illustrates a flow chart of a method for identifying a memory snapshot according to some embodiments of the present disclosure.

For ease of description, the process of identifying a memory snapshot implemented by method 200 will be described by taking an object as an example. However, as stated above, this is illustrative only and is not intended to limit the scope of the present disclosure in any way. Method 200 described herein is equally applicable to other processes for identifying a memory snap shot.

At block 202, a probability that a plurality of memory snapshots are operated within a first time period is determined based on operation-related historical information for the plurality of memory snapshots. In some embodiments, the historical information may be described using an input/output (I/O) access to object 102 as an example. The I/O access and the time when the I/O access occurs form a time sequence. Each object has its own time sequence, and each time sequence records the occurrence of one operation at different times.

In some embodiments, the method may further include: classifying the plurality of memory snapshots into corresponding modes based on the historical information. The method may further include: in the plurality of identified memory snapshots, identifying one or more memory snapshots of the same mode as a group of memory snapshots. The method may further include: deleting the group of memory snapshots in batches. As an example, the plurality of memory snapshots may be classified based on a time sequence corresponding to the historical operation information and using at least one of the following algorithms: least squares method, autocorrelation method, Fourier transform method, etc.

The operation on each memory snapshot may be recorded to form a corresponding time sequence. Therefore, these time sequences may be fitted using some algorithms (e.g., a curve fitting algorithm), and the corresponding mode of memory snapshots can be determined based on the shape of the fitted curve (for example, in an XY coordinate system).

For different time sequences, the least squares method may be firstly used to fit a curve of time sequences in an XY coordinate system. If the fitted curve is found to conform to the curve of a trend mode, the memory snapshots corresponding to the time sequence may be classified as the trend mode. Secondly, if the fitted curve does not conform to the curve of the trend mode, the autocorrelation method or discrete Fourier transform may be used to determine whether the time sequence conforms to the curve of a periodic mode. If it does not conform to the curve of the periodic mode, either, it is determined that the time sequence is irregular, and it is impossible to predict how the time sequence will change in the future. It can be understood that these algorithms may be used in different orders (such as at the same time), rather than only in the order described above.

In some embodiments, the modes of the memory snapshots may include a trend mode in which the number of times that the memory snapshots are operated gradually increases or decreases. The modes may further include a periodic mode in which memory snapshots are periodically operated. Furthermore, the modes may further include an irregular mode in which the memory snapshots are operated at irregular times.

The meanings of these three modes will also be introduced in the following description with reference to FIGS. 4 to 6.

In some embodiments, the probability that the plurality of memory snapshots are operated within the first time period is associated with a probability density function of corresponding probabilities that the operation occurs at different times. As an example, the probability may be determined by: integrating a probability density function that indicates corresponding probabilities that the operation occurs at different times.

Figure 3:
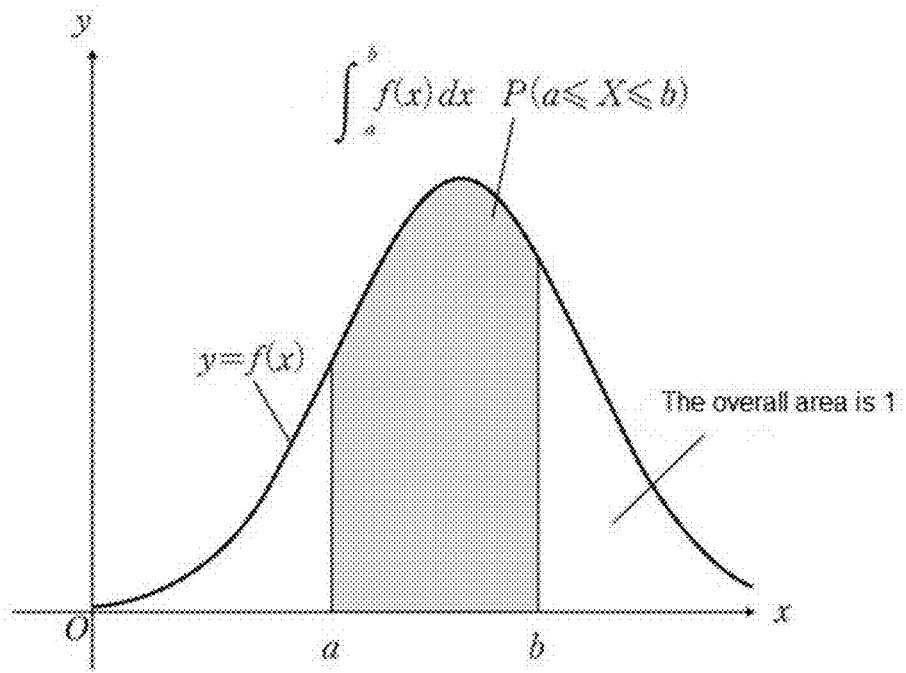
FIG. 3 illustrates a schematic diagram of a probability density function according to some embodiments of the present disclosure.

FIG. 3 illustrates a schematic diagram of a probability density function according to some embodiments of the present disclosure.

As an example, a general toolkit, Kernel Density Estimation (KDE), may be used to estimate the probability density function y=f(x). The probability density function indicates the time when the operation occurs and the density of a probability that the operation occurs at that time, and the time may be a future time. That is, it is a prediction of the probability that the operation will occur again in the future. As shown in the figure, the probability that the operation between a and b (representing a time period between time a and time b) in the figure occurs is the shaded area (i.e., an integral value).

Returning now to FIG. 2, in some embodiments, the duration of the first time period associated with the threshold may be determined based on the probability density function. Since the probability density function has been already known, the corresponding probability may be obtained by integrating the probability density function within a period of time. As an example, if a user expects the probability that a memory snapshot will be operated in the next 10 days is a certain specific value, the user may use this value as a target to calculate the duration of the corresponding time period (for the convenience of description, it is referred to as first time period herein).

In some embodiments, the threshold may be determined according to the distribution of a time sequence corresponding to the historical information or may be designated by a user. In some cases, the magnitude of the threshold may be determined based on the distribution of the time sequence of the operation. For example, a region with the most concentrated operation distribution corresponding to the time sequence indicates the time when the memory snapshot is most likely to be operated, and the magnitude of the corresponding threshold may be determined based on that time. In some other cases, a user may designate the magnitude of the threshold according to actual usage.

At block 204, if the determined probability is less than the threshold associated with the duration of the first time period, the plurality of memory snapshots are identified for deletion. The identified memory snapshots represent that the probability at which they may be operated again in the future is low. Therefore, in some embodiments, these memory snapshots may be presented to a user in the form of a list, and the user may confirm whether to delete these memory snapshots.

Through method 200, the probability that a memory snapshot will be operated again in a reasonable future period of time may be inferred based on operation-related historical information of the memory snapshot, so the probability is relatively accurate. In addition, the probability may intuitively reflect the value of the memory snapshot to a certain extent. For a memory snapshot that is unlikely to be operated again, the user may be prompted to delete it. Considering some special cases, the user may decide whether to back up some important but less frequently operated memory snapshots.

In some embodiments, method 200 may further include: if the determined probability is greater than the threshold associated with the duration of the first time period, identifying the plurality of memory snapshots for backup or re-storage.

Considering some special cases, some important but less frequently operated memory snapshots may be backed up rather than being deleted because of their low probability. This fully combines the actual situation of the user, so that method 200 may meet the following situation: due to data characteristics, a memory snapshot that still has the value of continued storage will not be deleted by mistake even if the probability that the memory snapshot is operated is low.

The meaning of the modes of memory snapshots described above will be described below with reference to FIGS. 4 to 6.

Figure 4:
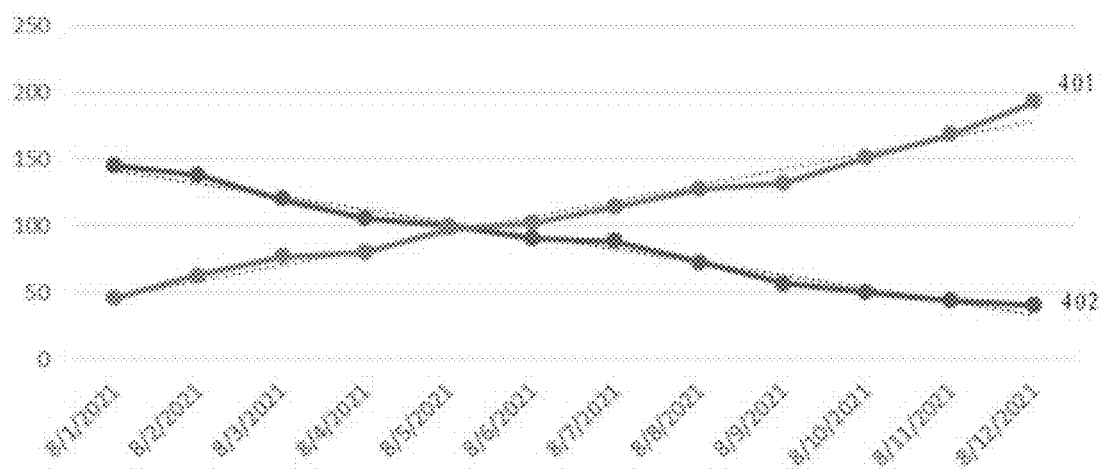
FIG. 4 illustrates a schematic diagram of a trend mode according to some embodiments of the present disclosure.

FIG. 4 illustrates a schematic diagram of a trend mode according to some embodiments of the present disclosure.

As shown in FIG. 4, the horizontal axis represents time, and the vertical axis represents the number of operations. It can be clearly seen from FIG. 4 that curve 401 exhibits an upward trend, which indicates that the number of operations on the memory snapshot increases over time. Therefore, memory snapshots corresponding to the time sequence of this shape belong to the trend mode. Furthermore, it can be found that curve 402 exhibits a downward trend, which indicates that the number of operations on the memory snapshot decreases over time. Therefore, memory snapshots corresponding to the time sequence of this shape also belong to the trend mode. It is worth noting that the time axis (horizontal axis) in FIG. 4 represents the time from August 1st to August 12th, but the present disclosure does not intend to limit the duration of this time. The duration of the time may also be longer or shorter, and the granularity of the time may also be second, minute, hour, month, etc., which depends on the need of an actual situation.

Figure 5:
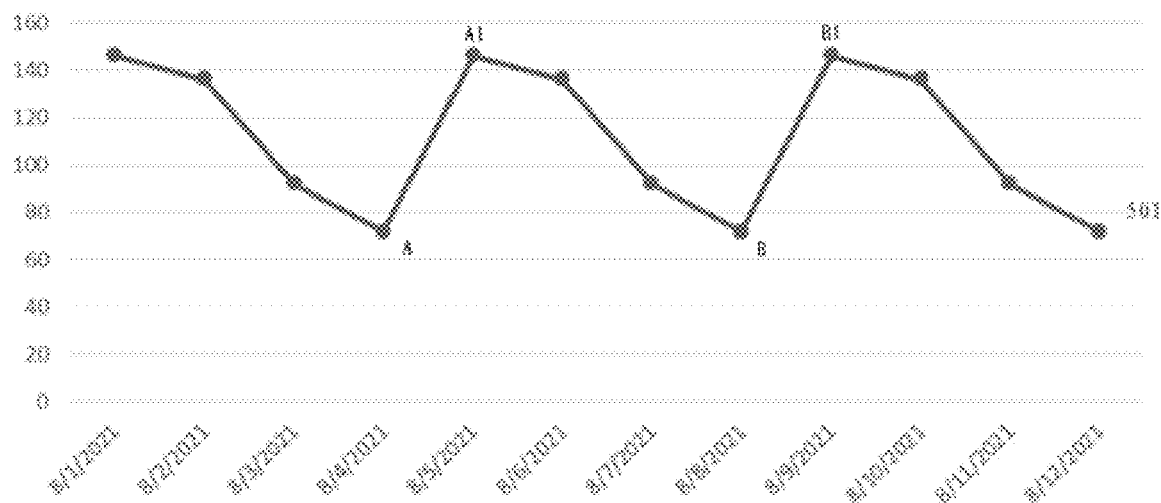
FIG. 5 illustrates a schematic diagram of a periodic mode according to some embodiments of the present disclosure.

FIG. 5 illustrates a schematic diagram of a periodic mode according to some embodiments of the present disclosure.

As shown in FIG. 5, similarly, the horizontal axis represents time, and the vertical axis represents the number of operations. It can be clearly seen from FIG. 5 that curve 501 may be divided into three segments by dividing point A and dividing point B, and each segment shows a downward trend. At dividing point A and dividing point B, the corresponding number of operations is the lowest. However, at first time point A1 and time point B1 after dividing point A and dividing point B, respectively, the number of operations rises to the highest point. In this way, it can be considered that curve 501 is regular and periodic, and each period represents a process from the highest point to the lowest point. Therefore, memory snapshots corresponding to the time sequence of this shape belong to the periodic mode. Likewise, the time axis (horizontal axis) in FIG. 5 represents the time from August 1st to August 12th, but the present disclosure does not intend to limit the duration of this time. The duration of the time may also be longer or shorter, and the granularity of the time may also be second, minute, hour, month, etc., which depends on the need of an actual situation.

Figure 6:
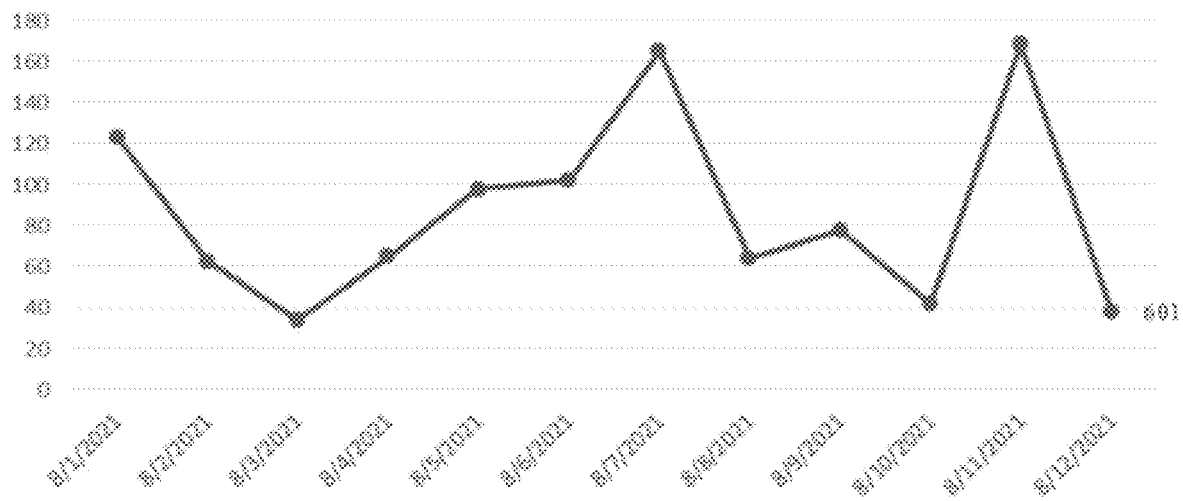
FIG. 6 illustrates a schematic diagram of an irregular mode according to some embodiments of the present disclosure.

FIG. 6 illustrates a schematic diagram of an irregular mode according to some embodiments of the present disclosure.

As shown in FIG. 6, the time sequence described by curve 601 is disorganized, and an equation describing the curve cannot be obtained by using a curve fitting algorithm. Therefore, a probability density (or probability) of the number of operations in future time cannot be predicted based on historical data of this curve.

Figure 7:
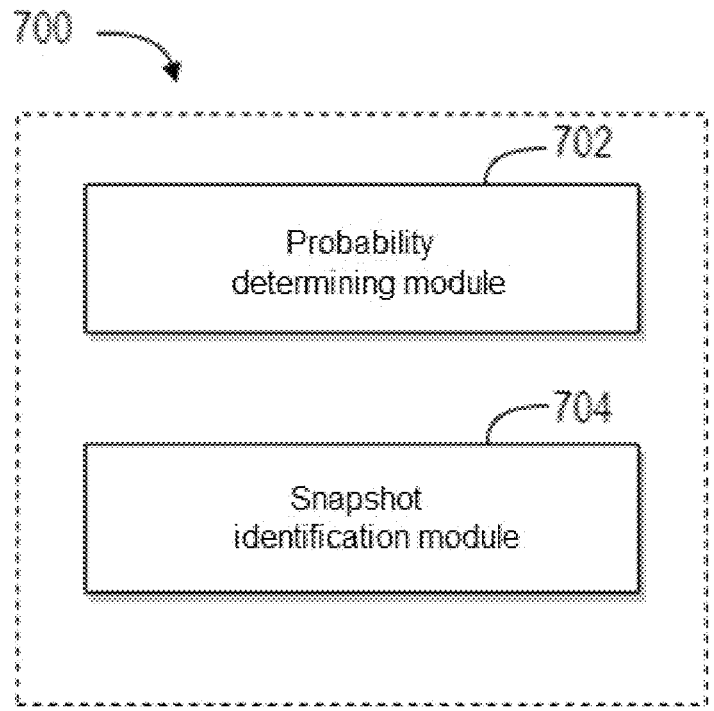
FIG. 7 illustrates a block diagram of an apparatus for identifying a memory snapshot according to some embodiments of the present disclosure.

FIG. 7 illustrates a block diagram of apparatus 700 for identifying a memory snapshot according to some embodiments of the present disclosure.

Apparatus 700 includes probability determining module 702 configured to determine, based on operation-related historical information for a plurality of memory snapshots, a probability that the plurality of memory snapshots are operated within a first time period.

Apparatus 700 further includes snapshot identification module 704 configured to, if the determined probability is less than a threshold associated with a duration of the first time period, identify the plurality of memory snapshots for deletion.

In some embodiments, probability determining module 702 may be further configured to classify the plurality of memory snapshots into corresponding modes based on the historical information; in the plurality of identified memory snapshots, identify one or more memory snapshots of the same mode as a group of memory snapshots; and delete the group of memory snapshots in batches.

In some embodiments, the modes of the memory snapshots include a trend mode in which the number of times that the memory snapshots are operated gradually increases or decreases. The modes further include a periodic mode in which the memory snapshots are periodically operated. The modes further include an irregular mode in which the memory snapshots are operated at irregular times.

In some embodiments, the probability that the plurality of memory snapshots are operated within the first time period is associated with a probability density function of corresponding probabilities that the operation occurs at different times.

In some embodiments, probability determining module 702 may be further configured to determine, based on the probability density function, the duration of the first time period associated with the threshold.

In some embodiments, the threshold is determined according to the distribution of a time sequence corresponding to the historical information or is designated by a user.

In some embodiments, snapshot identification module 704 may be further configured to, if the determined probability is greater than the threshold associated with the duration of the first time period, identify the plurality of memory snapshots for backup or re-storage.

It can be understood that the memory snapshots identified by apparatus 700 described above are memory snapshots with a low probability of being used within a future period of time. Therefore, these memory snapshots are reliable and secure no matter they are manually deleted by a user or deleted in batches according to a preset rule (such as user preference). An explainable reliable basis for making a decision is provided. Therefore, apparatus 700 may also provide, for example, at least one advantage in the foregoing advantages of method 200.

Figure 8:
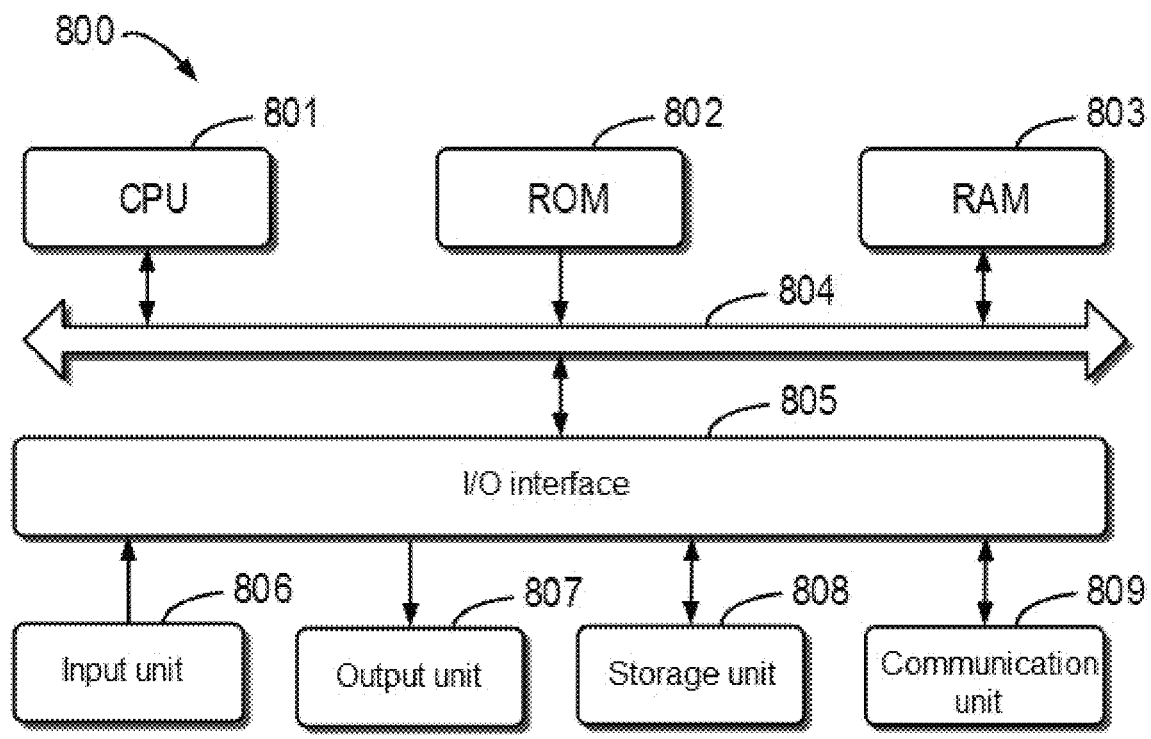
FIG. 8 illustrates a schematic block diagram of an example device that may be used to implement some embodiments according to the present disclosure.

FIG. 8 illustrates a schematic block diagram of device 800 that may be configured to implement embodiments of the present disclosure. Device 800 may be a device or apparatus described in the embodiments of the present disclosure. As shown in FIG. 8, device 800 includes central processing unit (CPU) 801, which may execute various appropriate actions and processing in accordance with computer program instructions stored in read-only memory (ROM) 802 or computer program instructions loaded onto random access memory (RAM) 803 from storage unit 808. Various programs and data required for the operation of device 800 may also be stored in RAM 803. CPU 801, ROM 802, and RAM 803 are connected to each other through bus 804. Input/output (I/O) interface 805 is also connected to bus 804. Although not shown in FIG. 8, device 800 may also include a co-processor.

A plurality of components in device 800 are connected to I/O interface 805, including: input unit 806, such as a keyboard and a mouse; output unit 807, such as various types of displays and speakers; storage unit 808, such as a magnetic disk and an optical disc; and communication unit 809, such as a network card, a modem, and a wireless communication transceiver. Communication unit 809 allows device 800 to exchange information/data with other devices via a computer network, such as the Internet, and/or various telecommunication networks.

The various methods or processes described above may be performed by processing unit 801. For example, in some embodiments, the method may be embodied as a computer software program that is tangibly included in a machine-readable medium, such as storage unit 808. In some embodiments, part or all of the computer program may be loaded and/or installed onto device 800 via ROM 802 and/or communication unit 809. When the computer program is loaded into RAM 803 and executed by CPU 801, one or more steps or actions of the methods or processes described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, instruction set architecture (ISA) instructions, machine instructions, machine-related instructions, microcode, firmware instructions, status setting data, or source code or object code written in any combination of one or more programming languages, the programming languages including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in the reverse order, depending on the functions involved. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Various embodiments of the present disclosure have been described above. The foregoing description is illustrative rather than exhaustive, and is not limited to the disclosed various embodiments. Numerous modifications and alterations are apparent to those of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed here.

Some example implementations of the present disclosure are listed below.

In a first aspect of the present disclosure, a method for identifying a memory snapshot is provided. The method includes determining, based on operation-related historical information for a plurality of memory snapshots, a probability that the plurality of memory snapshots are operated within a first time period. The method further includes: if the determined probability is less than a threshold associated with a duration of the first time period, identifying the plurality of memory snapshots for deletion.

In some embodiments, the method further includes: classifying the plurality of memory snapshots into corresponding modes based on the historical information. The method further includes: in the plurality of identified memory snapshots, identifying one or more memory snapshots of the same mode as a group of memory snapshots. The method further includes: deleting the group of memory snapshots in batches.

In some embodiments, the modes of the memory snapshots include a trend mode in which the number of times that the memory snapshots are operated gradually increases or decreases. The modes further include a periodic mode in which the memory snapshots are periodically operated. The modes further include an irregular mode in which the memory snapshots are operated at irregular times.

In some embodiments, the probability that the plurality of memory snapshots are operated within the first time period is associated with a probability density function of corresponding probabilities that the operation occurs at different times.

In some embodiments, the method further includes: determining the duration of the first time period associated with the threshold based on the probability density function.

In some embodiments, the threshold is determined according to the distribution of a time sequence corresponding to the historical information or is designated by a user.

In some embodiments, the method further includes: if the determined probability is greater than the threshold associated with the duration of the first time period, identifying the plurality of memory snapshots for backup or re-storage.

In a second aspect of the present disclosure, an electronic device is provided. The electronic device includes a processor and a memory coupled to the processor, the memory having instructions stored therein which, when executed by the processor, cause the device to perform actions. The actions include determining, based on operation-related historical information for a plurality of memory snapshots, a probability that the plurality of memory snapshots are operated within a first time period. The actions further include, if the determined probability is less than a threshold associated with a duration of the first time period, identifying the plurality of memory snapshots for deletion.

In some embodiments, the actions further include classifying the plurality of memory snapshots into corresponding modes based on the historical information. The actions further include, in the plurality of identified memory snapshots, identifying one or more memory snapshots of the same mode as a group of memory snapshots. The actions further includes deleting the group of memory snapshots in batches.

In some embodiments, the modes of the memory snapshots include a trend mode in which the number of times that the memory snapshots are operated gradually increases or decreases. The modes further include a periodic mode in which the memory snapshots are periodically operated. The modes further include an irregular mode in which the memory snapshots are operated at irregular times.

In some embodiments, the probability that the plurality of memory snapshots are operated within the first time period is associated with a probability density function of corresponding probabilities that the operation occurs at different times.

In some embodiments, the actions further include determining, based on the probability density function, the duration of the first time period associated with the threshold.

In some embodiments, the threshold is determined according to the distribution of a time sequence corresponding to the historical information or is designated by a user.

In some embodiments, the actions further include: if the determined probability is greater than the threshold associated with the duration of the first time period, identifying the plurality of memory snapshots for backup or re-storage.

In an embodiment of the third aspect, an apparatus for identifying a memory snapshot is provided. The apparatus includes a probability determining module configured to determine, based on operation-related historical information for a plurality of memory snapshots, a probability that the plurality of memory snapshots are operated within a first time period. The apparatus further includes a snapshot identification module configured to, if the determined probability is less than a threshold associated with a duration of the first time period, identify the plurality of memory snapshots for deletion.

In an embodiment of the fourth aspect, a computer-readable storage medium is provided. The computer-readable storage medium stores one or more computer instructions, wherein the one or more computer instructions are executed by a processor to implement the method according to the first aspect.

In an embodiment of the fifth aspect, a computer program product is provided. The computer program product includes one or more computer instructions, wherein the one or more computer instructions, when executed by a processor, implement the method according to the first aspect.

Although the present disclosure has been described in language specific to structural features and/or methodological logical actions, it should be understood that the subject matter defined in the appended claims is not necessarily limited to the specific features or actions described above. Rather, the specific features and actions described above are merely example forms of implementing the claims.

The invention claimed is:

1. A method for identifying a memory snapshot, comprising:
   determining, based on a probability density associated with operation history associated with a set of memory snapshots, a probability that a memory snapshot will be operated upon within a first time period, wherein the operation history comprises at least one of search, access, or backup;
   in response to determining that the memory snapshot has less than a threshold probability of being operated upon within the first time period, marking the memory snapshot for deletion; and
   deleting the memory snapshot.

2. The method according to claim 1, further comprising:
   grouping the set of memory snapshots into modes based on the operation history;
   identifying a group of memory snapshots of the set of memory snapshots, the group of memory snapshots having a same mode; and
   deleting the group of memory snapshots as a batch.

3. The method according to claim 2, wherein the modes comprise:
   a trend mode in which a set of time sequences that the memory snapshots are operated upon fits a curve in an XY coordinate system;
   a periodic mode in which the memory snapshots are periodically operated upon; and
   an irregular mode in which the memory snapshots are operated upon at irregular times.

4. The method according to claim 1, wherein the probability that the memory snapshot is operated upon within the first time period is associated with a probability density function of corresponding probabilities that the memory snapshot is operated upon at different times.

5. The method according to claim 4, further comprising:
   determining, based on the probability density function, a duration of the first time period.

6. The method according to claim 5, wherein the threshold probability is determined according to a distribution of a set of time sequences corresponding to the operation history or is designated by a user.

7. The method according to claim 1, further comprising:
   in response to determining that the probability is greater than the threshold probability associated with the first time period, marking the memory snapshot for at least one of backup or re-storage.

8. An electronic device, comprising:
a processor; and
a memory coupled to the processor, wherein the memory has instructions stored therein, and the instructions, when executed by the processor, cause the electronic device to execute actions comprising:
determining, based on a probability density associated with operation history associated with a set of memory snapshots, a probability a memory snapshot will be operated upon within a first time period, wherein the operation history comprises at least one of search, access, or backup;
in response to determining that the memory snapshot has less than a threshold probability of being operated upon within the first time period, marking the memory snapshot for deletion; and
deleting the memory snapshot.

9. The electronic device according to claim 8, wherein the actions further comprise:
grouping the set of memory snapshots into modes based on the operation history;
identifying a group of memory snapshots of the set of memory snapshots, the group of memory snapshots having a same mode; and
deleting the group of memory snapshots as a batch.

10. The electronic device according to claim 9, wherein the modes comprise:
a trend mode in which a set of time sequences that the memory snapshots are operated upon fits a curve in an XY coordinate system;
a periodic mode in which the memory snapshots are periodically operated upon; and
an irregular mode in which the memory snapshots are operated upon at irregular times.

11. The electronic device according to claim 8, wherein the probability that the memory snapshot is operated upon within the first time period is associated with a probability density function of corresponding probabilities that the memory snapshot is operated upon at different times.

12. The electronic device according to claim 11, wherein the actions further comprise:
determining, based on the probability density function, a duration of the first time period.

13. The electronic device according to claim 12, wherein the threshold probability is determined according to a distribution of a set of time sequences corresponding to the operation history or is designated by a user.

14. The electronic device according to claim 8, wherein the actions further comprise:
in response to determining that the probability is greater than the threshold probability associated with the first time period, marking the memory snapshot for at least one of backup or re-storage.

15. A non-transitory computer-readable medium having instructions stored therein, which when executed by a processor, cause the processor to perform operations comprising:
determining, based on a probability density associated with operation history associated with a set of memory snapshots, a probability a memory snapshot will be operated upon within a first time period, wherein the operation history comprises at least one of search, access, or backup;
in response to determining that the memory snapshot has less than a threshold probability of being operated upon within the first time period, marking the memory snapshot for deletion; and
deleting the memory snapshot.

16. The computer-readable medium according to claim 15, wherein the operations further comprise:
grouping the set of memory snapshots into modes based on the operation history;
identifying a group of memory snapshots of the set of memory snapshots, the group of memory snapshots having a same mode; and
deleting the group of memory snapshots as a batch.

17. The computer-readable medium according to claim 16, wherein the modes comprise:
a trend mode in which a set of time sequences that the memory snapshots are operated upon fits a curve in an XY coordinate system;
a periodic mode in which the memory snapshots are periodically operated upon; and
an irregular mode in which the memory snapshots are operated upon at irregular times.

18. The computer-readable medium according to claim 15, wherein the probability that the memory snapshot is operated upon within the first time period is associated with a probability density function of corresponding probabilities that memory snapshot is operated upon at different times.

19. The computer-readable medium according to claim 18, wherein the operations further comprise:
determining, based on a probability density function, a duration of the first time period.

20. The computer-readable medium according to claim 19, wherein the threshold probability is determined according to a distribution of a set of time sequences corresponding to the operation history or is designated by a user.

* * * * *